(12) United States Patent
Roither

(10) Patent No.: US 6,513,790 B1
(45) Date of Patent: Feb. 4, 2003

(54) ELECTROMOTIVE ADJUSTMENT ASSEMBLY

(75) Inventor: Andreas Roither, Bielefeld (DE)

(73) Assignee: Dewert Antriebs- und Systemtechnik GmbH & Co. KG, Kirchlengern (DE)

(*) Notice: Subject to any disclaimer, the term of this patent is extended or adjusted under 35 U.S.C. 154(b) by 0 days.

(21) Appl. No.: 09/705,628

(22) Filed: Nov. 3, 2000

(30) Foreign Application Priority Data

Nov. 11, 1999 (DE) ..................... 299 23 059 U

(51) Int. Cl.[7] .................................................. B66F 3/18
(52) U.S. Cl. .................. 254/103; 254/98; 108/144; 362/386
(58) Field of Search .................. 254/98, 103; 362/404, 362/405, 147, 403; 248/328, 332, 329; 108/147

(56) References Cited

U.S. PATENT DOCUMENTS

| 2,368,748 A | * | 2/1945 | Doty | 311/39 |
|---|---|---|---|---|
| 4,316,238 A | * | 2/1982 | Booty | 362/147 |
| 5,285,733 A | * | 2/1994 | Waibel | 108/144 |
| 5,365,862 A | * | 11/1994 | Peterson | 108/144 |
| 5,420,772 A | * | 5/1995 | Evans | 362/386 |
| 5,626,328 A | * | 5/1997 | Schneider | 254/98 |
| 5,758,867 A | * | 6/1998 | Arnesson | 254/103 |

FOREIGN PATENT DOCUMENTS

| EP | 1099878 A3 | 8/2001 |
|---|---|---|
| FR | 2 589 051 | 10/1995 |

* cited by examiner

Primary Examiner—Joseph J. Hail, III
Assistant Examiner—Daniel Shanley
(74) Attorney, Agent, or Firm—Henry M. Feiereisen

(57) ABSTRACT

An electromotive adjustment assembly, includes at least two spindles, each spindle carrying a spindle nut, with both spindle nuts secured against executing a rotation movement. A motor unit is positioned between the spindles and coupled in driving relationship with the spindles for rotating the spindles, whereby the spindles are secured against displacement in longitudinal direction. Connected, directly or indirectly, to the spindle nuts are flexible pull strands which are trained over deflection rollers for attachment with their free ends to profiled lifting members which are secured at an angle to a structure to be adjusted.

16 Claims, 3 Drawing Sheets

ELECTROMOTIVE ADJUSTMENT ASSEMBLY

CROSS-REFERENCES TO RELATED APPLICATIONS

This application claims the priority of German Patent Application Serial No. 299 23 059.7, filed Nov. 11, 1999, the subject matter of which is incorporated herein by reference.

BACKGROUND OF THE INVENTION

The present invention relates in general to an electromotive adjustment assembly.

A conventional electromotive adjustment assembly is known which has two aligned spindles disposed in a common housing. Each spindle is driven by a motor via a reduction gear unit, so that operation of the spindles can be effected independently from one another in both rotation directions. Spindle nuts mounted on the spindles interact with articulated levers which ultimately convert a linear movement of the spindle nuts in a rotation movement of the furniture item being adjusted, or vice versa, so as to move the furniture item, for example, the head board or foot boards of a slatted frame, into the desired position. This type of adjustment assembly is, however, not suitable when the height of large-area components, such as tabletops, is intended to be moved.

SUMMARY OF THE INVENTION

It is thus an object of the present invention to provide an improved electromotive adjustment assembly, obviating the afore-stated drawbacks.

In particular, it is an object of the present invention to provide an improved electromotive adjustment assembly which is universally applicable for realizing a height adjustment of a structure, such as a furniture item, and yet is simple in construction.

These objects, and others which will become apparent hereinafter, are attained in accordance with the present invention by providing a motor unit positioned between the spindles and coupled in driving relationship with the spindles for rotating the spindles, with the spindles being secured against displacement longitudinally in the direction of the axis, and by providing a lifting device including profiled lifting members mounted at an angle to a structure to be lifted, and flexible pull strands linked to the spindle nuts and trained over deflection rollers for attachment of their free ends to the lifting members.

It is now possible to mount an electromotive adjustment assembly according to the present invention, for example, underneath a table top with the spindles oriented horizontally, because, in accordance with the present invention, horizontal movements are converted into vertical movement. The profiled lifting members can be elevated via the pull strands as the spindle nuts move toward one another, whereas a lowering of the structure is implemented by reversing the rotation direction of the spindles, thereby also preventing the possibility of a sudden drop of the structure. The arrangement of the pull strands depends on the application at hand.

According to another feature of the present invention, the two spindles are oriented in alignment to one another and have pitches in opposite direction. In this manner, the motor unit for the spindles is especially simple in nature as a small number of drive wheels is only required. The opposing pitches of the spindles ensure a travel of the respectively attached spindle nuts in opposite directions. Since right-hand spindles are generally preferred, it is also proposed that the spindles rotate in opposite directions. This can be realized through appropriate configuration of the motor unit for driving the spindles. As the output speed of an electric motor is high, it is suitable to couple the motor unit with a reduction gear unit, preferably a worm gearing, for transmitting the power of the motor unit to the spindles.

In order to prevent the flexible pull strands from touching the spindles, lifting or thrust tubes are mounted onto the spindle nuts to follow the movement of the spindle nuts, whereby the elastic pull strands are attached to the free ends of the lifting or thrust tubes. Such a configuration is suitable, for example, for a table with two lateral columns.

According to another feature of the present invention, the profiled lifting members are inner profiled sections which are guided in outer guide tubes. The inner profiled sections may be pipes and may be made, for example, of aluminum. In the case of a table, the guide tubes may be formed by the table legs, with the inner profiled sections mounted to the underside of the tabletop at a right angle thereto. The deflection rollers are suitably arranged on confronting areas in the upper zone of the guide tubes.

In order to keep friction during travel of the inner profiled sections to a minimum and to prevent a tilting or canting of the inner profiled sections, the inner surfaces of the outer guide tubes have inner surfaces positioned at a distance to the outer surfaces of the inner profiled sections, whereby slide pieces may be provided which can be mounted to the inner surfaces of the outer guide tubes and/or the outer surfaces of the inner profiled sections. Thus, the inner profiled sections can be guided in the guide tubes in an enclosed environment.

When utilizing an electromotive adjustment assembly for height adjustment of a tabletop, it may be required to move four inner profiled sections. In order to be able to use only a single adjustment assembly according to the present invention, it is proposed to use rods which are secured to the lifting tubes transversely thereto, for attachment of the flexible pull strands. The electromotive adjustment assembly according to the present invention is then disposed in the middle between opposing guide tubes. As only a single adjustment assembly is used, there is no need for a separate synchronizing control unit.

Operation of the electromotive adjustment assembly may be realized, for example, by a hand switch or, wireless, via a remote control.

Depending on its size, the structure to be moved may be relatively heavy. On the other hand, the power output of the motor unit should be as small as possible. In order to adjust a relatively heavy structure while still using a small motor unit, it is proposed to configure the pull strands as parts of a block and tackle. The power output of the electromotive adjustment assembly may then be kept to a minimum depending on the number of rollers.

According to another feature of the present invention, the spindles or spindle nuts may be associated to a gas spring, regardless of the configuration of the flexible pull strands, for assisting the lifting movement. Gas springs accommodate a piston rod which can move in and out, whereby a retraction of the piston rod or rods is realized by the own weight of the structure to be lowered.

The electromotive adjustment assembly according to the present invention is simple in construction and thus cost-efficient, and yet is capable to move even structures that are relatively heavy.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
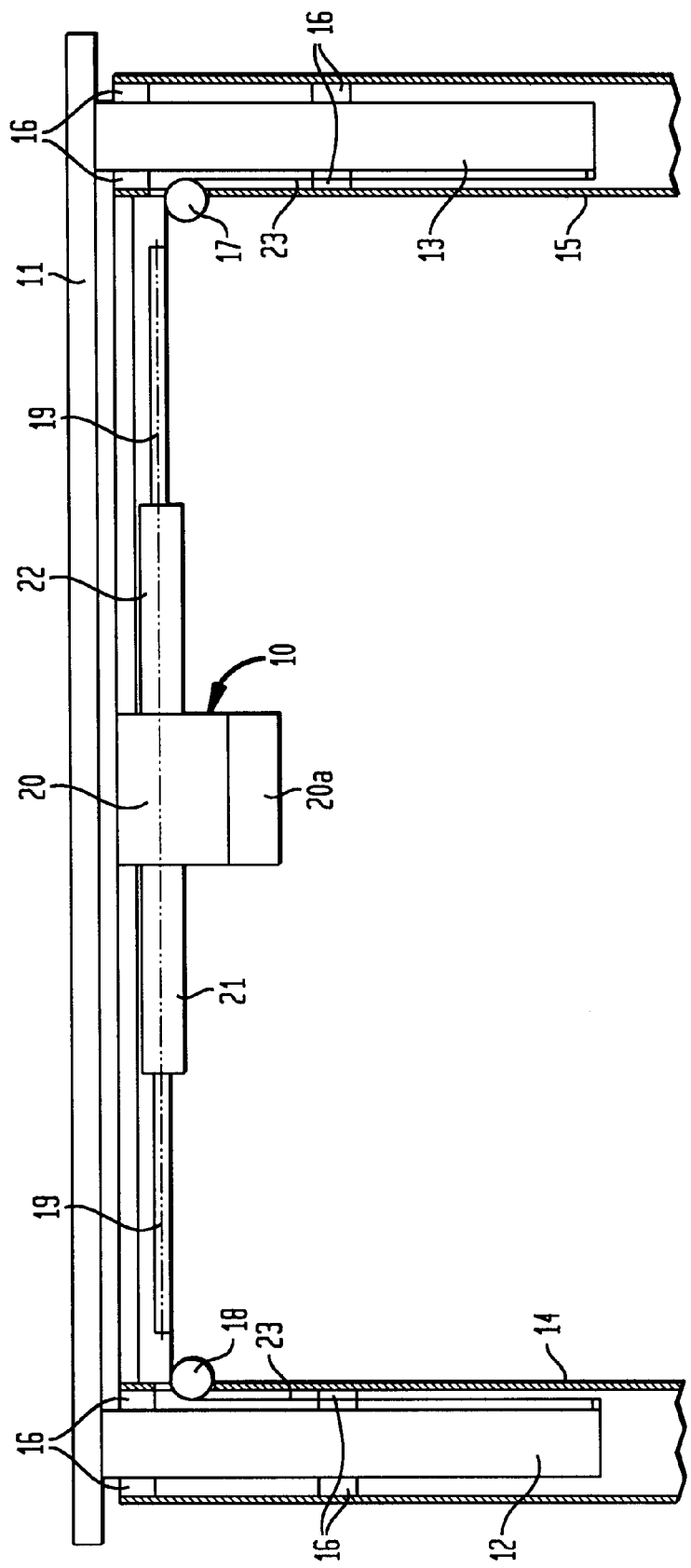
FIG. 1 is a schematic side view of one embodiment of an electromotive adjustment assembly according to the present invention for height adjustment of, for example, a tabletop.

Throughout all the Figures, same or corresponding elements are generally indicated by same reference numerals.

Turning now to the drawing, and in particular to FIG. 1, there is shown a schematic side view of an electromotive adjustment assembly according to the present invention, generally designated by reference numeral 10, for height adjustment of, for example, a tabletop 11. Mounted to the underside of the tabletop 11 in the corner regions are inner profiled sections 12, 13 (only two are shown here) which are positioned upright at a right angle to the tabletop 11. The inner profiled sections 12, 13 may be formed as light metal pipes and project, respectively, into table legs 14, 15 of a table frame. The table legs 14, 15 are formed as guide tubes which may also be made of light metal, preferably aluminum. The inner surfaces of the table legs 14, 15 are spaced from the outer surfaces of the inner profiled sections 12, 13. Sliders 16 are secured either to the inner surfaces of the table legs 14, 15 or to the outer surfaces of the inner profiled sections 12, 13 for guiding the inner profiled sections 12, 13 inside the table legs 14, 15. Associated to each table leg 14, 15 are deflection rollers 17, 18 which are rotatably supported in the upper region of the table frame at a slight distance to the tabletop 11.

Figure 2:
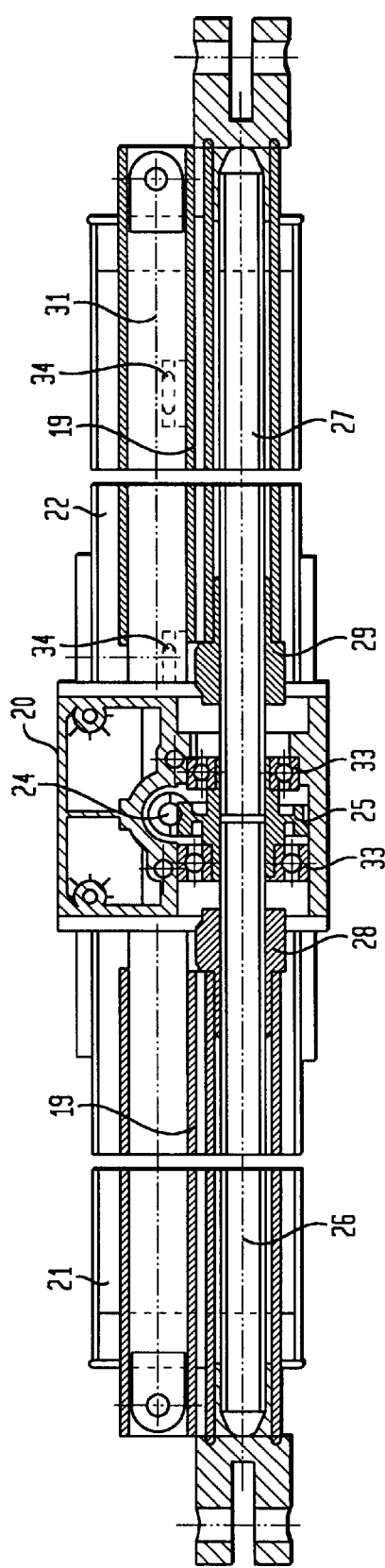
FIG. 2 is a sectional view of a drive system forming part of the electromotive adjustment assembly of FIG. 1.

Disposed in midsection of the table frame is the electromotive adjustment assembly 10 having a housing 20 for accommodating a drive comprised of an electric motor and a worm gearing, and described in more detail in FIG. 2. As shown in FIG. 2, the worm gearing includes a motor worm 24 in mesh with a worm wheel 25 and is supported by rolling contact bearings 33. Interacting with the worm wheel 25 of the worm gearing are two spindles 26, 27 with opposite pitch. The spindle 26 carries a spindle nut 28, and the spindle 27 carries a spindle nut 29, so that a rotation of the spindles 26, 27 is translated into a linear movement of the spindle nuts 28, 29 along the spindle 26, 27 as the spindle nuts 28, 29 are secured against executing a rotation movement. As shown by broken lines by way of example only with respect to the spindle nut 29, the linear movement of the spindle nut 29 can be limited through provision of suitable limit switches 34. Of course, analog limit switches may also be provided to restrict the linear travel of the spindle nut 28.

Each of the spindle nuts 28, 29 is connected to a lifting or thrust tube 19 so that the lifting tubes 19 follow the movement of the spindle nuts 28, 29 and thus can move in and out. At their free ends, distal to the worm gearing, the lifting tubes 19 are connected to one ends of flexible pull strands 23 which are guided over the deflections rollers 17, 18 and, preferably, formed by wire ropes. The other ends of the flexible pull strands 23 are secured to the lower area of the inner profiled sections 12, 13.

Mounted to the housing 20 of the drive are two outer flanged tubes 21, 22 which enclose the spindles 26, 27 and the lifting tubes 19.

Although not shown in detail, the deflection rollers 17, 18 may form part of a block and tackle and constitute the fixed rollers thereof. In addition, it is certainly possible to so modify the drive as to include gas springs for assisting the movement of the lifting tubes 19 for height adjustment of the table top 11. A specific construction and manner in which gas springs are operatively and functionally incorporated into the drive of the present invention is fully described in commonly assigned copending patent application by the same inventive entity, entitled "Electromotive Drive for a Furniture Item", filed simultaneously, the disclosure of which is incorporated herein by reference.

Mounted to the housing 20 of the drive is also a control unit 20a, shown only schematically here to allow a control of the operation of the spindles 26, 27. The electric motor may be activated by a hand switch or also wireless via a remote control.

In the nonlimiting example of the drawing, the spindles 26, 27 have threads with opposite pitch, i.e. spindle 26 has right-hand thread and spindle 27 has a left-hand thread. Of course, through suitable configuration of the drive, only right-hand spindles may be used so long as their rotation movements oppose one another.

Figure 3:
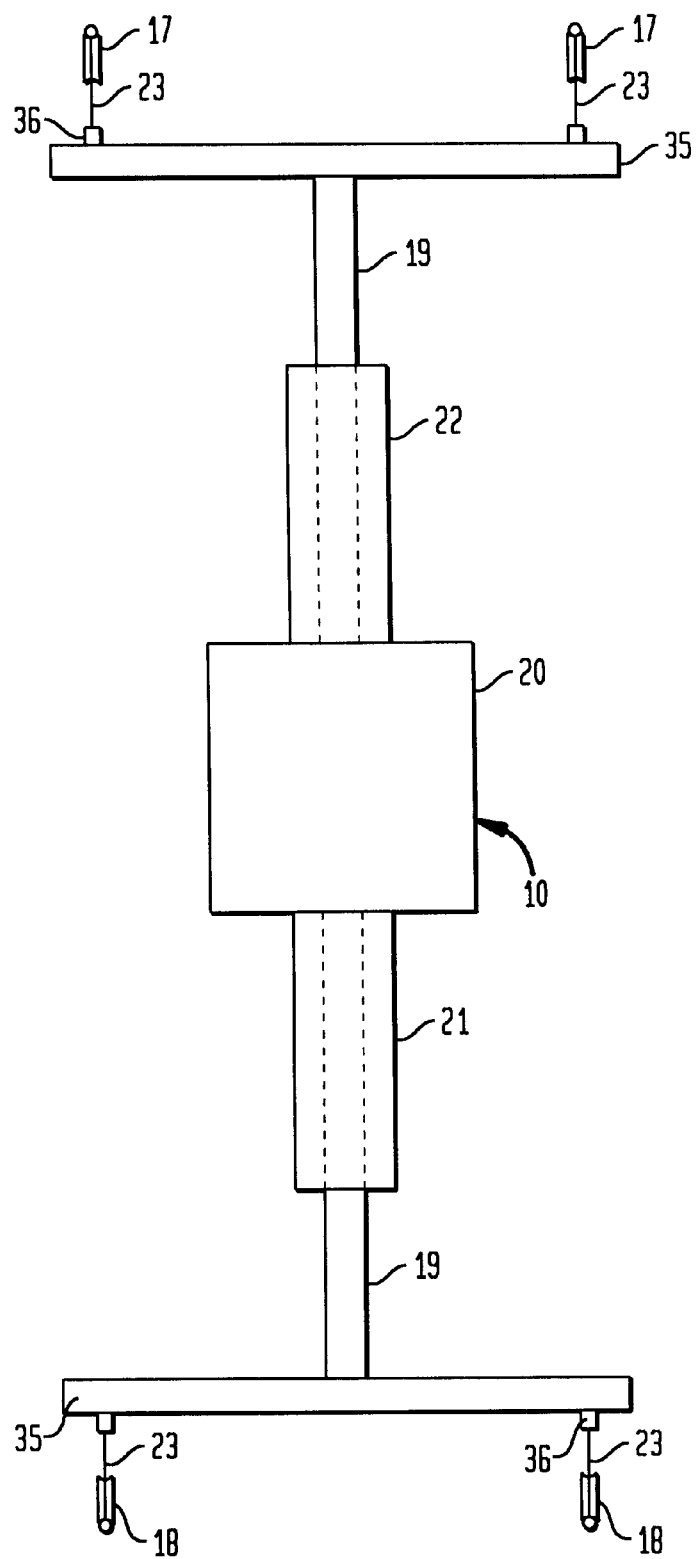
FIG. 3 is a schematic illustration of another embodiment of an electromotive adjustment assembly according to the present invention.

Turning now to FIG. 3, there is shown a schematic illustration of another embodiment of an electromotive adjustment assembly 10 according to the present invention. Parts corresponding with those in FIG. 1 are denoted by identical reference numerals and not explained again. In this embodiment, provision is made for the arrangement of rods 35 which are secured in mid-section to the lifting tubes 19 and extend transversely to the lifting tubes 19, whereby the pull strands 23 are secured via suitable mounts 36 to the lateral ends of the rods 35. This configuration permits the use of a single electromotive adjustment assembly disposed in the middle between opposing guide tubes 13, 14.

While the invention has been illustrated and described as embodied in a electromotive adjustment assembly, it is not intended to be limited to the details shown since various modifications and structural changes may be made without departing in any way from the spirit of the present invention.

What is claimed as new and desired to be protected by letters patent is set forth in the appended claims:

What is claimed is:

1. An electromotive adjustment assembly for height adjustment of a structure; comprising:

at least two spindles defining a longitudinal axis;

at least two spindle nuts, one of the spindle nuts placed on one of the spindles and secured against executing a rotation movement, and the other one of the spindle nuts placed on the other one of the spindles and secured against executing a rotation movement;

a motor unit positioned between and coupled in driving relationship with the spindles for rotating the spindles, said spindles being secured against displacement longitudinally in the direction of the axis; and a lifting device including profiled lifting members mounted at an angle to the structure for guiding the structure during height adjustment, and flexible pull strands linked to the spindle nuts and trained over deflection rollers for attachment of their free ends to the lifting members.

2. The adjustment assembly of claim 1 wherein the pull strands are secured directly to the spindle nuts.

3. The adjustment assembly of claim 1 wherein the lifting members are mounted at a right angle to the structure.

4. The adjustment assembly of claim 1 wherein the two spindles extend in alignment to one another and have pitches in opposite directions.

5. The adjustment assembly of claim 1 wherein the two spindles have pitches in same directions and rotate in opposite rotation directions.

6. The adjustment assembly of claim 1 wherein the lifting device includes at least two lifting tubes, one lifting tube secured to one spindle nut and the other lifting tube secured to the other spindle nut, said pull strands being fixed to free ends of the lifting tubes.

7. The adjustment assembly of claim 1, and further comprising a reduction gear unit for transmitting the power of the motor unit to the spindles.

8. The adjustment assembly of claim 7 wherein the reducing gear is a worm gearing.

9. The adjustment assembly of claim 6 wherein the lifting device includes rods extending transversely to the lifting tubes, said pull strands being fixed to free end regions of the rods.

10. The adjustment assembly of claim 1 wherein the lifting device has outer guide tubes, said lifting members being guided in the outer guide tubes and formed as inner profiled sections.

11. The adjustment assembly of claim 10 wherein the outer guide tubes have inner surfaces positioned at a distance to outer surfaces of the inner profiled sections, and further comprising slide pieces mounted to at least one of the inner surfaces of the outer guide tubes and the outer surfaces of the inner profiled sections.

12. The adjustment assembly of claim 1 wherein the deflection rollers for the pull strands are part of a block and tackle and form fixed rollers of the block and tackle.

13. The adjustment assembly of claim 10 wherein the inner profiled sections and the outer guide tubes are made of light metal.

14. The adjustment assembly of claim 13 wherein the inner profiled sections and the outer guide tubes are made of aluminum.

15. The adjustment assembly of claim 1 wherein at least one of the at least two spindles is operatively connected to a gas spring.

16. The adjustment assembly of claim 1 wherein each of the two spindles is operatively connected to a gas spring.

* * * * *